United States Patent
Fuller et al.

(10) Patent No.: US 9,448,659 B2
(45) Date of Patent: Sep. 20, 2016

(54) SIMULTANEOUS TOUCH SENSOR SCANNING AND DISPLAY REFRESHING FOR MINIMIZING DISPLAY DEGRADATION FOR DISPLAY-EMBEDDED TOUCH SENSORS

(71) Applicants: Andrew Fuller, Hampshire (GB); Samuel Brunet, Cowes (GB); Christopher Hill, Hampshire (GB); Vivek Pant, San Jose, CA (US); Grahame Reynolds, Hampshire (GB)

(72) Inventors: Andrew Fuller, Hampshire (GB); Samuel Brunet, Cowes (GB); Christopher Hill, Hampshire (GB); Vivek Pant, San Jose, CA (US); Grahame Reynolds, Hampshire (GB)

(73) Assignee: Atmel Corporation, San Jose, CA (US)

( * ) Notice: Subject to any disclaimer, the term of this patent is extended or adjusted under 35 U.S.C. 154(b) by 289 days.

(21) Appl. No.: 13/827,713

(22) Filed: Mar. 14, 2013

(65) Prior Publication Data

US 2014/0267067 A1    Sep. 18, 2014

(51) Int. Cl.
*G06F 3/041* (2006.01)
*G06F 3/044* (2006.01)

(52) U.S. Cl.
CPC ............. *G06F 3/0416* (2013.01); *G06F 3/044* (2013.01)

(58) Field of Classification Search
CPC ...................................................... G06F 3/041
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2009/0315854 A1 | 12/2009 | Matsuo | |
| 2011/0187677 A1* | 8/2011 | Hotelling | G06F 3/0412 345/174 |
| 2012/0162104 A1* | 6/2012 | Chang et al. | 345/173 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2014/0285462 A1* | 9/2014 | Lee | G09G 3/3648 345/173 |

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Aneeta Yodichkas
*Assistant Examiner* — Karin Kiyabu
(74) *Attorney, Agent, or Firm* — Baker Botts L.L.P.

(57) ABSTRACT

In one embodiment, a method includes receiving a request to refresh a display for a refresh period, wherein the display is coupled to a touch sensor operable to detect touch input at the display. The method also includes refreshing a first portion of the display and activating the touch sensor at a second portion of the display different from the first portion of the display during a first portion of the refresh period. The method further includes, during a second portion of the refresh period, refreshing a third portion of the display different from the first and second portions of the display and activating the touch sensor at a fourth portion of the display different from the first, second, and third portions of the display.

12 Claims, 6 Drawing Sheets

SIMULTANEOUS TOUCH SENSOR SCANNING AND DISPLAY REFRESHING FOR MINIMIZING DISPLAY DEGRADATION FOR DISPLAY-EMBEDDED TOUCH SENSORS

TECHNICAL FIELD

This disclosure generally relates to touch sensors, and more particularly to touch sensor scanning for display-embedded touch sensors.

BACKGROUND

Touch sensing using a sensor embedded in a display may be typically carried out during periods when the display is not being updated. However, current approaches for doing this may be limited. For example, the amount of time available for carrying out a scan of the touch sensor is limited by the amount of time necessary for display updating. Thus, the flexibility to employ techniques that avoid or suppress external noise is limited. As another example, the frequency at which the touch controller can provide updates of touches to the host may be limited due to the increased amount of time between successive touch sensor scans. These constraints may degrade the touch controller performance in ways that are undesirable to the end user experience.

DESCRIPTION OF EXAMPLE EMBODIMENTS

Touch sensing using a sensor embedded in a display, such as an LCD scanning display, may be synchronized to times when the display is not being updated (and may be referred to as the "blanking periods"). Because the display and touch functions often share common circuitry or wiring, the display update function and touch sensing function may be mutually exclusive. If they are not mutually exclusive, degradation of the displayed image or touch sensing performance may be observed.

Currently, touch sensing using a sensor embedded in a display may be carried out during periods when the display is not being updated. However, current approaches for doing this may be limited. For example, the amount of time available for carrying out a scan of the touch sensor is limited by the amount of time necessary for display updating. Thus, the flexibility to employ techniques that avoid or suppress external noise is limited. As another example, the frequency at which the touch controller can provide updates of touches to the host may be limited due to the increased amount of time between successive touch sensor scans. These constraints may degrade the touch controller performance in ways that are undesirable to the end user experience.

Accordingly, aspects of the present disclosure include a method of scanning a touch sensor, such as a capacitive touch sensor, embedded in a display, such as an LCD scanning display (e.g., an active matrix display), that allows touch sensing to be carried out while the display is being updated without causing degradation to the displayed image quality. Since display degradation normally occurs when touch sensing is carried out at the same time and in the same region that the display is being updated, the display degradation may be avoided by employing synchronization between the display and the touch sensing controller that ensures that touch sensing cannot be carried out at the same time and in the same region that the display is being updated.

By allowing touch sensing to be carried out at the same time as display update, the present disclosure may remove the majority of constraints associated with the synchronized touch sensing techniques normally employed when using a touch sensor embedded in a display. As one example, the present disclosure allows for more flexibility in the implementation of noise suppression and noise avoidance schemes by the touch controller. In addition, the present disclosure provides much more time for touch scanning because touch scanning is permitted during display update. This additional time may be used to implement more sophisticated noise avoidance and suppression techniques such as frequency hoping and increased sample filtering.

As another example, the present disclosure allows for higher touch report rates for touch sensing schemes directly synchronized to display update rates. In conventional synchronized schemes, touch sensing may be linked directly to the display update rate, which may be 60 Hz. However, implementation of an optimal touch sensing user interface normally requires a report rate in excess of 100 Hz. The present disclosure provides more flexibility and time for touch sensing, which will allow for the touch sensor to be scanned at twice per display update, providing an effective report rate of 120 Hz and optimizing the user experience.

Figure 1:
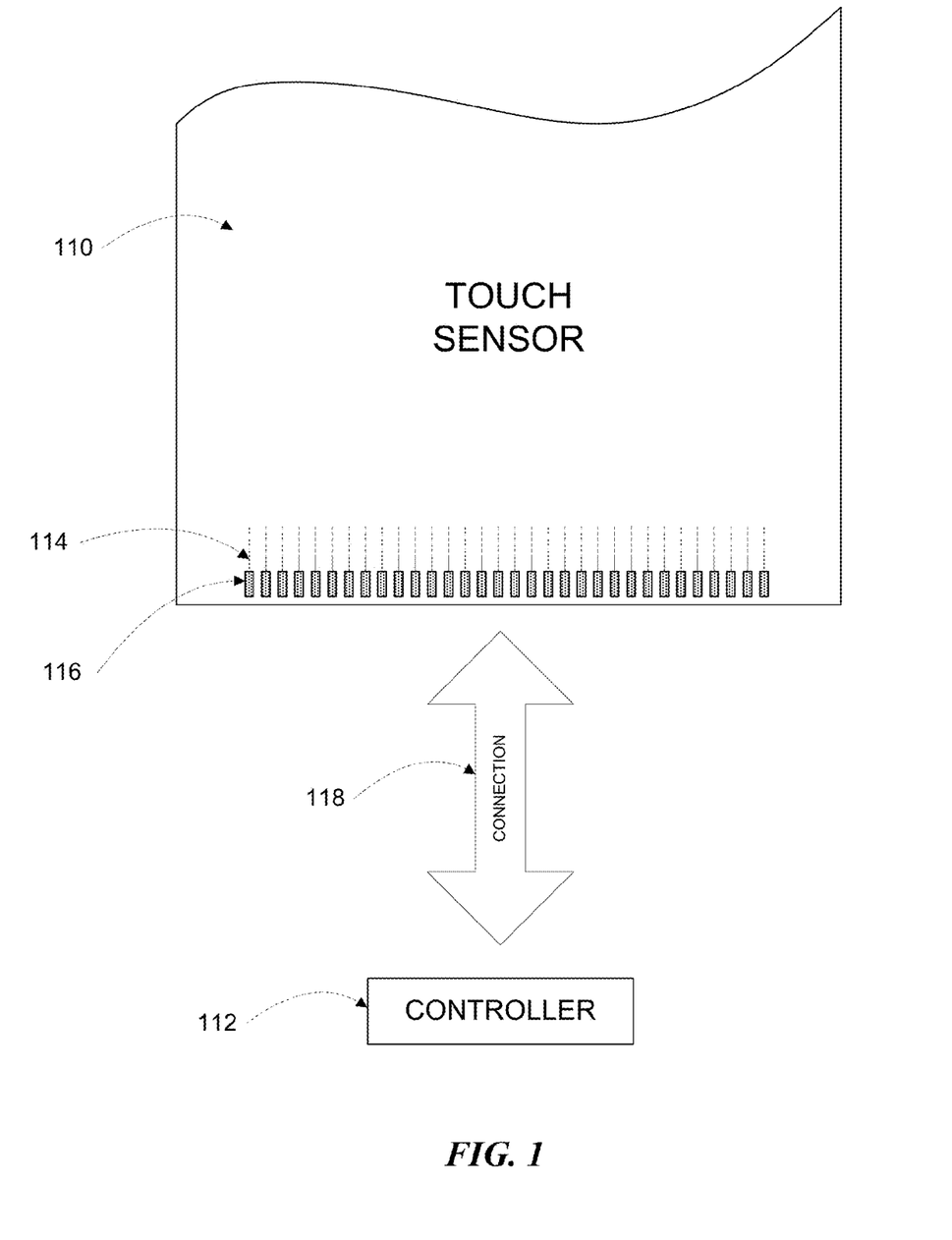
FIG. 1 illustrates an example touch sensor according to particular embodiments of the present disclosure.

FIG. 1 illustrates an example touch sensor 110 with an example touch-sensor controller 112. Touch sensor 110 and touch-sensor controller 112 may detect the presence and location of a touch or the proximity of an object within a touch-sensitive area of touch sensor 110. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 110 may include one or more touch-sensitive areas, where appropriate. Touch sensor 110 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 110. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 110 and touch-sensor controller 112. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display. As another example, the mechanical stack may include the layers shown in FIGS. 2A-2B and described further below.

One or more portions of the substrate of touch sensor 110 may be made of polyethylene terephthalate (PET), glass, or another suitable material. This disclosure contemplates any suitable substrate with any suitable portions made of any suitable material. In particular embodiments, the drive or sense electrodes in touch sensor 110 may be made of ITO in whole or in part. In particular embodiments, the drive or sense electrodes in touch sensor 110 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 110 may implement a capacitive form of touch sensing. In a mutual-capacitance implementation, touch sensor 110 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 112) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 112 may measure the change in capacitance. By measuring changes in capacitance throughout the array, touch-sensor controller 112 may determine the position of the touch or proximity within the touch-sensitive area(s) of touch sensor 110.

In a self-capacitance implementation, touch sensor 110 may include an array of electrodes of a single type that may each form a capacitive node. When an object touches or comes within proximity of the capacitive node, a change in self-capacitance may occur at the capacitive node and touch-sensor controller 112 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 112 may determine the position of the touch or proximity within the touch-sensitive area(s) of touch sensor 110. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 110 may indicate a touch or proximity input at the position of the capacitive node. Touch-sensor controller 112 may detect and process the change in capacitance to determine the presence and location of the touch or proximity input. Touch-sensor controller 112 may then communicate information about the touch or proximity input to one or more other components (such one or more central processing units (CPUs)) of a device that includes touch sensor 110 and touch-sensor controller 112, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 112 may be one or more integrated circuits (ICs), such as for example general-purpose microprocessors, microcontrollers, programmable logic devices or arrays, application-specific ICs (ASICs). In particular embodiments, touch-sensor controller 112 comprises analog circuitry, digital logic, and digital non-volatile memory. In particular embodiments, touch-sensor controller 112 is disposed on a flexible printed circuit (FPC) bonded to the substrate of touch sensor 110, as described below. The FPC may be active or passive, where appropriate. In particular embodiments, multiple touch-sensor controllers 112 are disposed on the FPC. Touch-sensor controller 112 may include a processor unit, a drive unit, a sense unit, and a storage unit. The drive unit may supply drive signals to the drive electrodes of touch sensor 110. The sense unit may sense charge at the capacitive nodes of touch sensor 110 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 110. The processor unit may also track changes in the position of a touch or proximity input within the touch-sensitive area(s) of touch sensor 110. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 114 of conductive material disposed on the substrate of touch sensor 110 may couple the drive or sense electrodes of touch sensor 110 to connection pads 116, also disposed on the substrate of touch sensor 110. As described below, connection pads 116 facilitate coupling of tracks 114 to touch-sensor controller 112. Tracks 114 may extend into or around (e.g. at the edges of) the touch-sensitive area(s) of touch sensor 110. Particular tracks 114 may provide drive connections for coupling touch-sensor controller 112 to drive electrodes of touch sensor 110, through which the drive unit of touch-sensor controller 112 may supply drive signals to the drive electrodes. Other tracks 114 may provide sense connections for coupling touch-sensor controller 112 to sense electrodes of touch sensor 110, through which the sense unit of touch-sensor controller 112 may sense charge at the capacitive nodes of touch sensor 110. Tracks 114 may be made of fine lines of metal or other conductive material. As an example and not by way of limitation, the conductive material of tracks 114 may be copper or copper-based and have a width of approximately 100 µm or less. As another example, the conductive material of tracks 114 may be silver or silver-based and have a width of approximately 100 µm or less. In particular embodiments, tracks 114 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 114, touch sensor 110 may include one or more ground lines terminating at a ground connector (which may be a connection pad 116) at an edge of the substrate of touch sensor 110 (similar to tracks 114).

Connection pads 116 may be located along one or more edges of the substrate, outside the touch-sensitive area(s) of touch sensor 110. As described above, touch-sensor controller 112 may be on an FPC. Connection pads 116 may be made of the same material as tracks 114 and may be bonded to the FPC using an anisotropic conductive film (ACF). Connection 118 may include conductive lines on the FPC coupling touch-sensor controller 112 to connection pads 116, in turn coupling touch-sensor controller 112 to tracks 114 and to the drive or sense electrodes of touch sensor 110. In another embodiment, connection pads 116 may be connected to an electro-mechanical connector (such as a zero insertion force wire-to-board connector); in this embodiment, connection 118 may not need to include an FPC. This disclosure contemplates any suitable connection 118 between touch-sensor controller 112 and touch sensor 110.

Figure 2A:
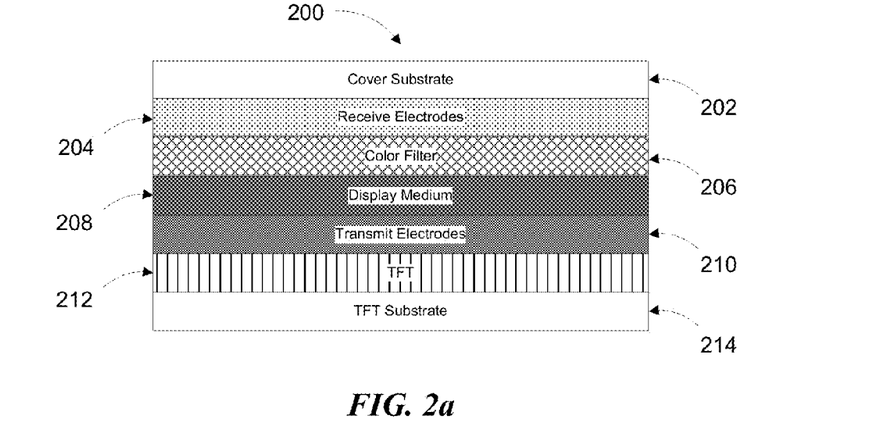
FIGS. 2A-2B illustrate an example display-embedded touch sensor according to particular embodiments of the present disclosure.
Figure 2B:
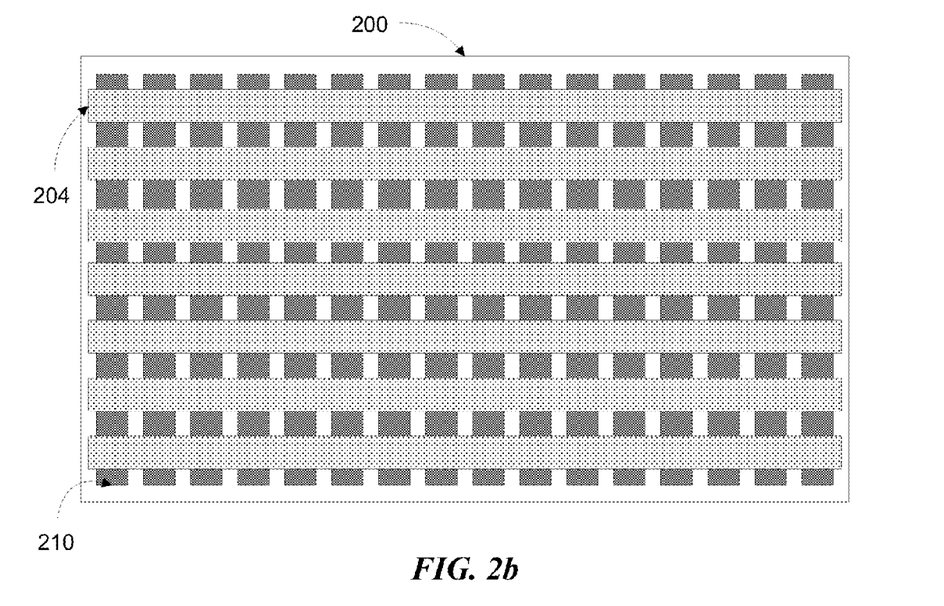

FIGS. 2A-2B illustrate an example display-embedded touch sensor stack 200. In particular embodiments, touch sensor 200 may include, without limitation, a thin film transistor (TFT) substrate 214, TFT layer 212, transmit electrodes 210, display medium 208 (e.g. a liquid crystal display (LCD)), color filter 206, receive electrodes 204, and cover substrate 202 as shown in FIG. 2A. TFT layer 212 may include one or more electronic components (e.g., transistors) suitable for powering and/or controlling display medium 208. In particular embodiments, TFT substrate 214 may be the substrate for both TFT layer 212 and transmit electrodes 210, and may be approximately 0.4 mm thick. Similarly, in particular embodiments, cover substrate 202 may be the substrate for receive electrodes 204 and color filter 206, and may comprise glass and be approximately 0.2-0.4 mm thick. Other suitable layers may be added to touch sensor stack 200 or some layers may be removed from touch sensor stack 200 as necessary in other embodiments. FIG. 2B illustrates an alternative perspective of the view shown in FIG. 2A, with the receive electrodes 204 and transmit electrodes 210 intersecting one another, such as in a capacitive touch sensor configuration.

In display-embedded touch sensors, such as touch sensor stack 200, the touch sensing components and the display components may share certain electronic. For example, the transmit electrodes 210 may also act as the reference voltage source for the display components (e.g., TFT layer 212) of touch sensor 200. However, when activating the touch sensing functions of the display-embedded sensor, a pulse voltage may be applied to the transmit electrodes 210. This additional pulse voltage in the reference voltage of the display circuit may thus cause display degradation when touch sensing is carried out at the same time and in the same region that the display is being updated. Display degradation may be avoided, however, by employing synchronization between the display and the touch sensing controller that ensures that touch sensing is not carried out at the same time and in the same region that the display is being updated, as shown in FIGS. 3A-3D and FIG. 4 and explained further below.

FIGS. 3A-3D illustrate example phases of a display refresh cycle for the display-embedded touch sensor of FIGS. 2A-2B. Although a display update is considered to be a continuous update across a screen, for purposes of sensing schemes according to embodiments of the present disclosure, the display may be divided into multiple sections and the display update may be considered to have a number of phases. In particular embodiments, the number of display phases may equal the number of display sections. For instance, in the illustrated example of FIGS. 3A-3D, the display is divided into four sections (quadrants) and the display refresh cycle has four phases. Any suitable number of display divisions and/or number of refresh phases may be used, however. For example, in some embodiments, the display may be divided into six sections while the display refresh may have six phases. As another example, in some embodiments, the display may be divided into eight sections while the display refresh may have eight phases.

Figure 3A:
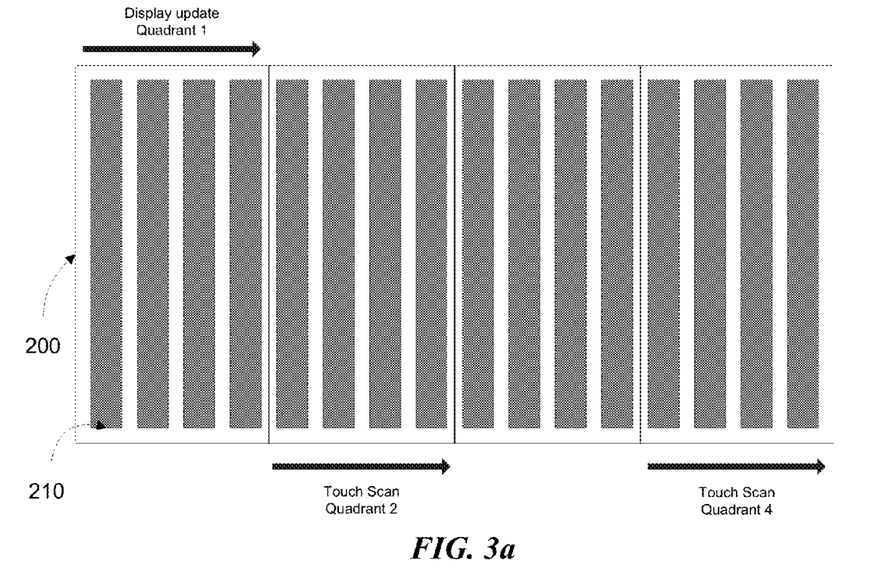
FIGS. 3A-3D illustrate example phases of a display refresh cycle for the display-embedded touch sensor of FIGS. 2A-2B according to particular embodiments of the present disclosure.
Figure 3B:
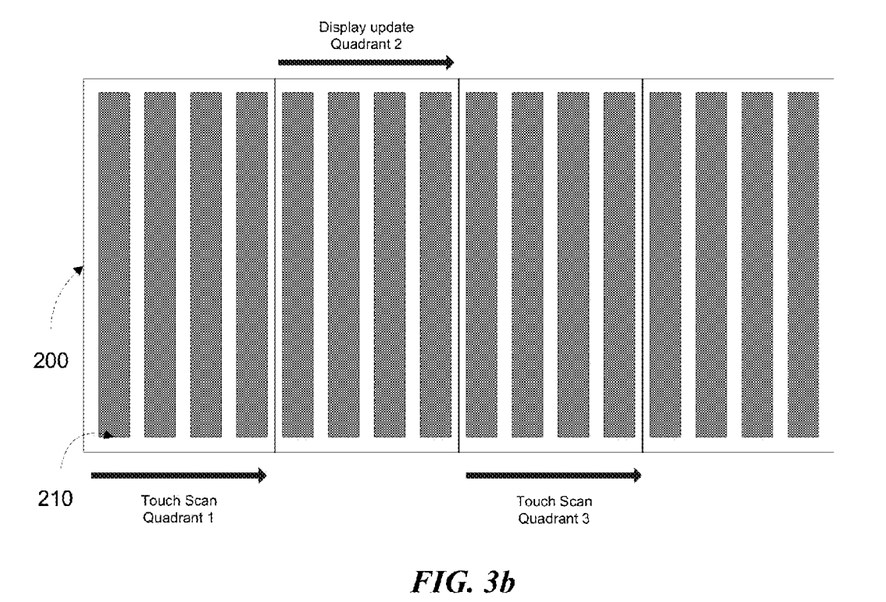
Figure 3C:
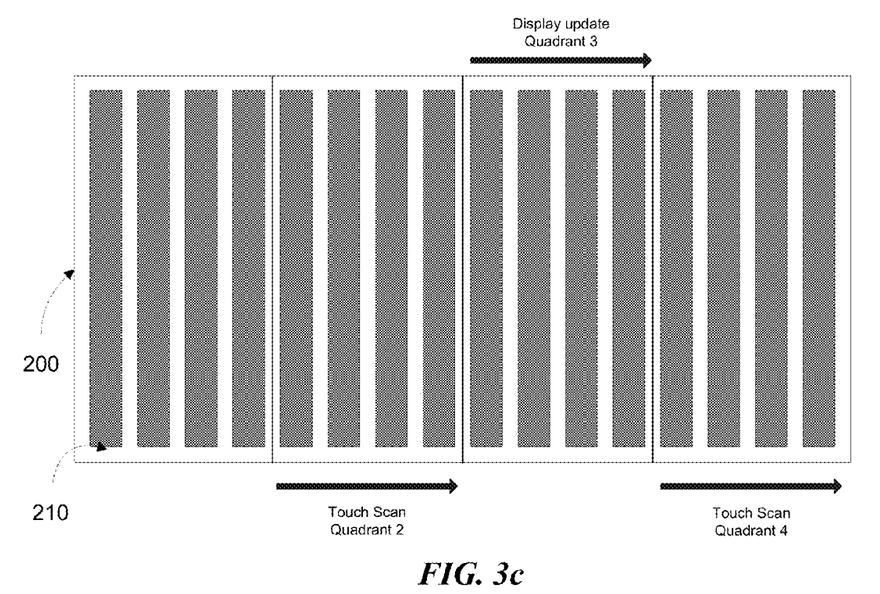
Figure 3D:
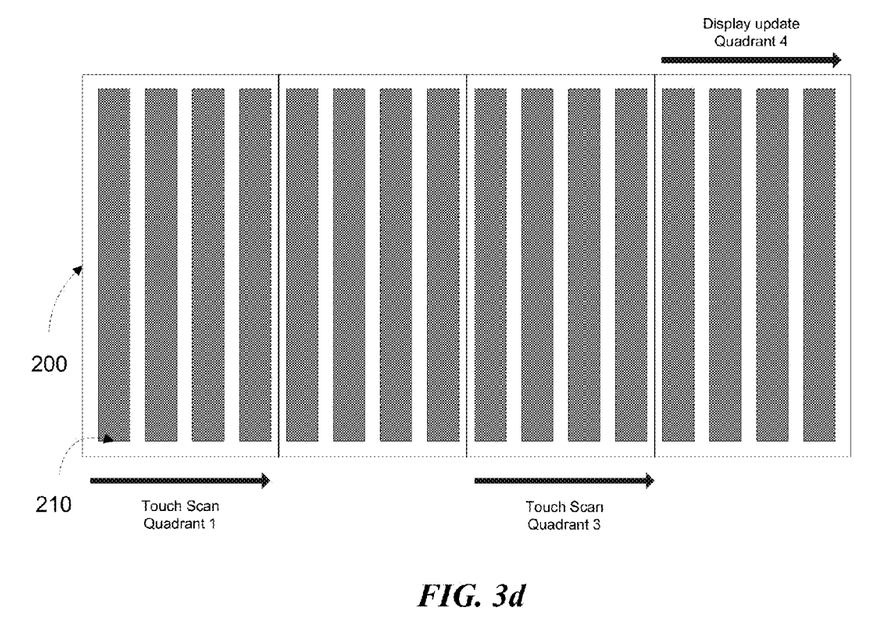

FIG. 3A represents the first phase of the display refresh cycle. During the first phase of the refresh cycle, the first quadrant of the display may refresh (i.e., do not receive a pulse voltage at transmit electrodes 210) while the transmit electrodes in the second and fourth quadrants scan for touch input (i.e., receive a pulse voltage at transmit electrodes 210). During the second phase of the display refresh cycle, as shown in FIG. 3B, the second quadrant of the display may refresh while the transmit electrodes in the first and third quadrants scan for touch input. During the third phase of the display refresh cycle, as shown in FIG. 3C, the third quadrant of the display may refresh while the transmit electrodes in the second and fourth quadrants scan for touch input again. During the fourth phase of the display refresh cycle, as shown in FIG. 3D, the fourth quadrant of the display may refresh while the transmit electrodes in the first and third quadrants scan for touch input again.

One of skill in the art will recognize that the touch sensor of FIGS. 3A-3D will scan for touch input at a rate that is twice the display update frequency. Thus, in a display with a typical refresh rate of 60 Hz, the touch input report rate would be 120 Hz, which is well above an optimal report rate of 100 Hz. As explained above, in conventional synchronized touch sensing schemes in display-embedded touch sensors, touch sensing may be linked directly to the display update rate, which in this example would be 60 Hz and below the optimal minimum report rate of 100 Hz. Thus, aspects of the present disclosure may provide more optimal touch sensing feedback over conventional synchronized display-embedded touch sensors while also minimizing any display degradation that is caused by updating the display and sensing touch input simultaneously.

Figure 4:
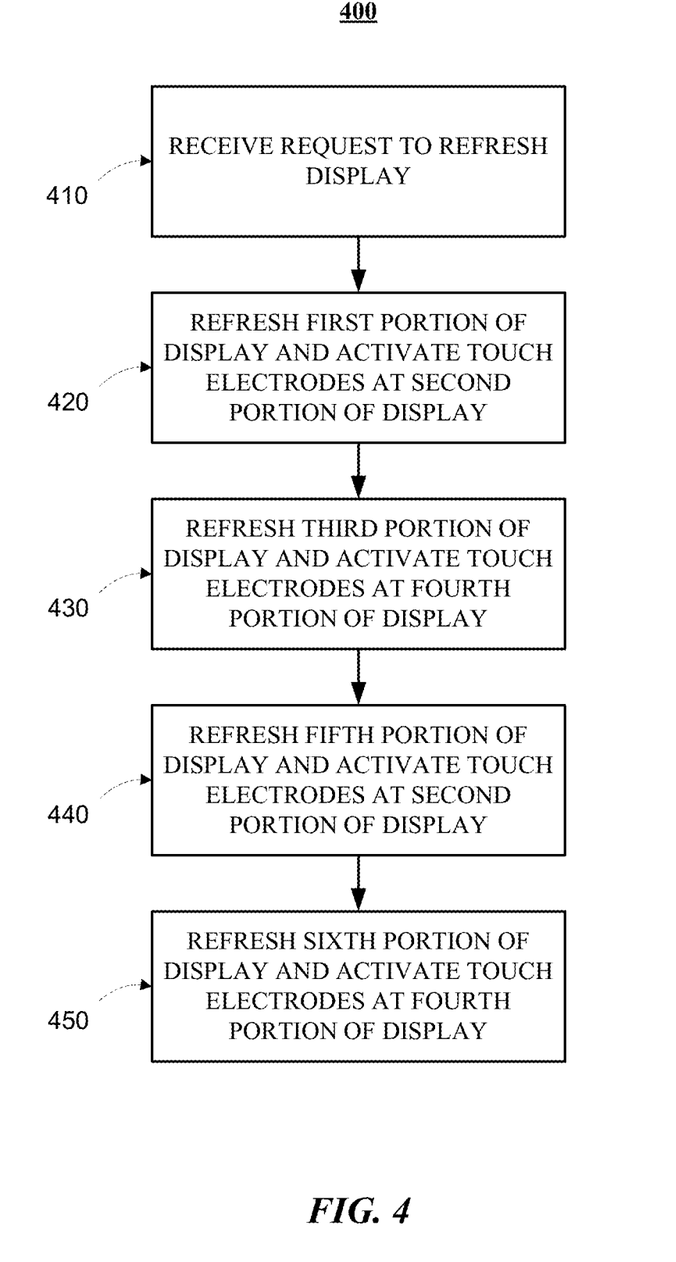
FIG. 4 illustrates an example method for touch sensor scanning of the display-embedded touch sensor of FIG. 2A-2B according to particular embodiments of the present disclosure.

FIG. 4 illustrates an example method for touch sensor scanning of the display-embedded touch sensor of FIG. 2A-2B. The method 400 may start at step 410, where a request to refresh or update the display is received. The request may be, for example and without limitation, a pulse voltage sent by a controller or processor coupled to the display-embedded touch sensor.

At step 420, a first portion of the display may be refreshed while the touch electrodes at a second portion of the display are activated. This step may take place during any portion of a display refresh period. For example, referring to the above example with four display refresh period portions, step 420 may take place in any of the four portions (e.g., those shown in FIGS. 3A-3D). In other words, the first portion of a display refresh period may be shown by FIG. 3A in some embodiments, while the first portion of a display refresh period may be shown by FIG. 3B in other embodiments. In particular embodiments, the first and second portions may be different from one another. In some embodiments, the first portion of the display may be adjacent to the second portion of the display, in whole or in part. For example, referring to FIG. 3A, the first portion of the display may be Quadrant 1, and the second portion of the display may be Quadrants 2 and 4. In this example, the first and second portions may be considered adjacent in part. Refreshing the first portion of the display may include, for example, sending a voltage signal to the pixels of the display located in the first portion. Activating the touch electrodes in the second portion of the display may include, for example, sending voltage pulses through the transmit electrodes of the touch sensor located in the second portion.

At step 430, a third portion of the display may be refreshed while the touch electrodes at a fourth portion of the display are activated. In particular embodiments, the third and fourth portions may be different from one another. In some embodiments, the third portion of the display may be adjacent to the fourth portion of the display, in whole or in part. For example, referring to FIG. 3B, the third portion of the display may be Quadrant 2, and the fourth portion of the display may be Quadrants 1 and 3. In this example, the third and fourth portions may be considered adjacent in whole.

At step 440, a fifth portion of the display may be refreshed while the touch electrodes at a second portion of the display are activated. In particular embodiments, the fifth and second portions may be different from one another. In some embodiments, the fifth portion of the display may be adjacent to the second portion of the display, in whole or in part. For example, referring to FIG. 3C, the fifth portion of the display may be Quadrant 3, and the second portion of the display may be Quadrants 2 and 4. In this example, the fifth and second portions may be considered adjacent in whole.

At step 450, a sixth portion of the display may be refreshed while the touch electrodes at a fourth portion of the display are activated. In particular embodiments, the sixth and fourth portions may be different from one another. In some embodiments, the sixth portion of the display may be adjacent to the fourth portion of the display, in whole or in part. For example, referring to FIG. 3D, the sixth portion of the display may be Quadrant 4, and the fourth portion of the display may be Quadrants 1 and 3. In this example, the sixth and fourth portions may be considered adjacent in part.

Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In addition, although the example method 400 of FIG. 4 describes a display divided into four quadrants and a display refresh cycle with four phases, any suitable number of display divisions and/or refresh phases are contemplated in the present disclosure. For example, method 400 may be adapted to an embodiment with eight display divisions and eight refresh phases. In such embodiments, the first portion of the display in step 420 may be section 1 of the eight display sections, and the second portion of the display may be sections 2 and 6. In step 430, the third portion of the display may be section 2 and the fourth portion of the display may be sections 1 and 5. Step 440 may therefore include refreshing a fifth portion of the display while activating the touch electrodes at a sixth portion of the display. (i.e., instead of activating the touch electrodes at the second portion as described above). The fifth portion of the display may be section 3 and the sixth portion may be sections 4 and 8. Step 450 may thus include refreshing a seventh portion of the display while activating the touch electrodes at an eighth portion of the display. The seventh portion may be section 4 and the eighth portion may be sections 3 and 7. In such embodiments, the method may continue in this pattern through additional steps until each display section of eight has been refreshed.

One of skill in the art will recognize that the method 400 (for any number of display sections) will scan for touch input at a rate that is twice the display update frequency. Thus, in a display with a refresh rate of 60 Hz, the touch input report rate would be 120 Hz, which is well above an optimal report rate of 100 Hz. One of skill in the art will also recognize that certain embodiments may allow for the two touch sensor regions being activated to be a half screen distance apart. For example, in the example shown in FIGS. 3A-3D, each region where the touch sensors are activated is two sections away from the other region where the touch sensors are being activated, which is half of the amount of display divisions (i.e., four display divisions). As another example, in the embodiment described above with eight display sections, each region where the touch sensors are being activated is four regions away from the other region where touch sensors are being activated, which is again half of the amount of display sections (i.e., eight display sections).

Figure 5:
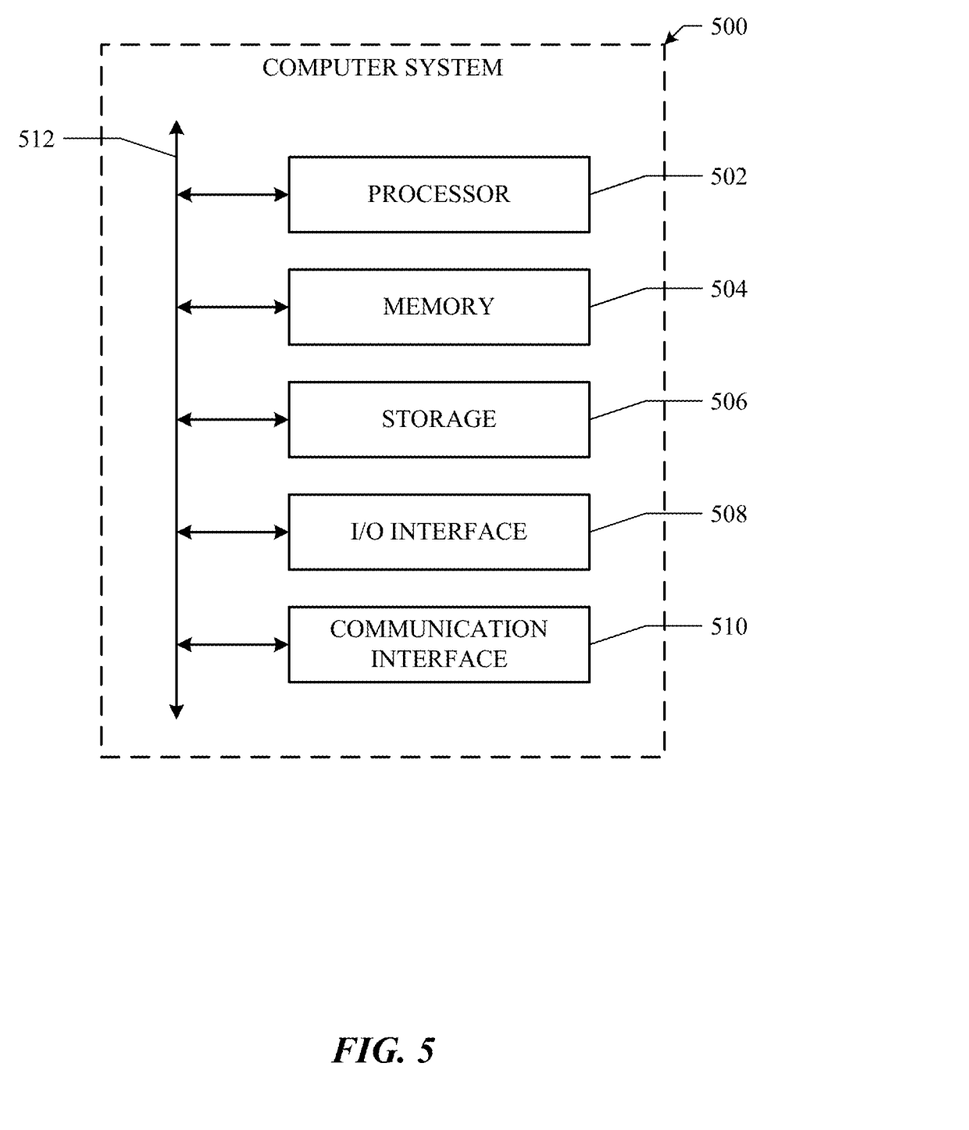
FIG. 5 illustrates an example computer system for use with the display-embedded touch sensors of FIGS. 2A-2B according to particular embodiments of the present disclosure.

FIG. 5 illustrates an example computer system 500 for use with the display-embedded touch sensors of FIGS. 2A-2B.

In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. In particular embodiments, the software running on one or more computer systems 500 may be logic encoded on a computer readable medium. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving a request to refresh a display for a refresh period comprising four phases, wherein the display is coupled to a touch sensor operable to detect touch input at the display;
   during a first phase of the refresh period:
      refreshing a first quadrant of the display, the first quadrant located at a first end of the display; and
      while refreshing the first quadrant of the display, activating the touch sensor at a second quadrant and a fourth quadrant of the display, the second quadrant and the fourth quadrant being a half screen distance apart;
      wherein the second quadrant of the display adjoins the first quadrant of the display, the fourth quadrant of the display is located at a second end of the display opposite the first end, and a third quadrant of the display is disposed between the second quadrant and the fourth quadrant; and
   during a second phase of the refresh period:
      refreshing the second quadrant of the display; and
      while refreshing the second quadrant of the display, activating the touch sensor at the first quadrant and the third quadrant of the display, the first quadrant and the third quadrant being a half screen distance apart.

2. The method of claim 1, wherein the refresh period of the display is approximately 0.0167 seconds.

3. The method of claim 1, further comprising:
   during a third phase of the refresh period:
      refreshing the third quadrant of the display; and
      while refreshing the third quadrant of the display, activating the touch sensor at the second quadrant and the fourth quadrant of the display.

4. The method of claim 3, further comprising:
   during a fourth phase of the refresh period:
      refreshing the fourth quadrant of the display; and
      while refreshing the fourth quadrant of the display, activating the touch sensor at the third quadrant and the first quadrant of the display.

5. A system, comprising:
   a display;
   a touch sensor coupled to the display and operable to detect touch input at the display; and
   a controller coupled to the display and the touch sensor, the controller comprising logic that is configured, when executed, to refresh the display in a refresh period comprising four phases and activate the touch sensor in the refresh period;
   wherein during a first phase of the refresh period of the display:
      the controller is configured to refresh a first quadrant of the display,
   the first quadrant located at a first end of the display; and
      while refreshing the first quadrant of the display, the controller is configured to activate the touch sensor at a second quadrant and a fourth quadrant of the display, the second quadrant and the fourth quadrant being a half screen distance apart, the second quadrant of the display adjoining the first quadrant of the display, the fourth quadrant of the display being located at a second end of the display opposite the first end, and a third quadrant of the display is disposed between the second quadrant and the fourth quadrant; and wherein during a second phase of the refresh period:
the controller is configured to refresh the second quadrant of the display; and
while refreshing the second quadrant of the display, the controller is configured to activate the touch sensor at the first quadrant and the third quadrant of the display, the first quadrant and the third quadrant being a half screen distance apart.

6. The system of claim 5, wherein the refresh period of the display is approximately 0.0167 seconds.

7. The system of claim 5, wherein during a third phase of the refresh period:
the controller is configured to refresh the third quadrant of the display; and
the controller is configured to activate the touch sensor at the second quadrant and the fourth quadrant of the display.

8. The system of claim 7, wherein during a fourth phase of the refresh period:
the controller is configured to refresh the fourth quadrant of the display; and
the controller is configured to activate the touch sensor at the third quadrant and the first quadrant of the display.

9. A non-transitory computer readable medium comprising logic operable, when executed by a processor, to:
receive a request to refresh a display for a refresh period comprising four phases, wherein the display is coupled to a touch sensor operable to detect touch input at the display;
during a first phase of the refresh period:
refresh a first quadrant of the display, the first quadrant located at a first end of the display; and
while refreshing the first quadrant of the display, activate the touch sensor at a second quadrant and a fourth quadrant of the display, the second quadrant and the fourth quadrant being a half screen distance apart;
wherein the second quadrant of the display adjoins the first quadrant of the display, the fourth quadrant of the display is located at a second end of the display opposite the first end, and a third quadrant of the display is disposed between the second quadrant and the fourth quadrant; and
during a second phase of the refresh period:
refresh the second quadrant of the display; and
while refreshing the second quadrant of the display, activate the touch sensor at the first quadrant and the third quadrant of the display, the first quadrant and the third quadrant being a half screen distance apart.

10. The non-transitory computer readable medium of claim 9, wherein the refresh period of the display is approximately 0.0167 seconds.

11. The non-transitory computer readable medium of claim 9, wherein the logic is further operable to:
during a third phase of the refresh period:
refreshing the third quadrant of the display; and
while refreshing the third quadrant of the display, activating the touch sensor at the second quadrant and the fourth quadrant of the display.

12. The non-transitory computer readable medium of claim 11, wherein the logic is further operable to:
during a fourth phase of the refresh period:
refreshing the fourth quadrant of the display; and
while refreshing the fourth. quadrant of the display, activating the touch sensor at the third quadrant and the first quadrant of the display.

\* \* \* \* \*

UNITED STATES PATENT AND TRADEMARK OFFICE
CERTIFICATE OF CORRECTION

PATENT NO. : 9,448,659 B2
APPLICATION NO. : 13/827713
DATED : September 20, 2016
INVENTOR(S) : Fuller et al.

It is certified that error appears in the above-identified patent and that said Letters Patent is hereby corrected as shown below:

Specification

Col. 16, Ln. 31: After "fourth" and before "quadrant" delete "."

Signed and Sealed this
Twenty-second Day of November, 2016

Michelle K. Lee
*Director of the United States Patent and Trademark Office*